No. 631,372. Patented Aug. 22, 1899.
T. B. LAUMANN.
ANIMAL RELEASING DEVICE.
(Application filed Apr. 8, 1899.)
(No Model.)
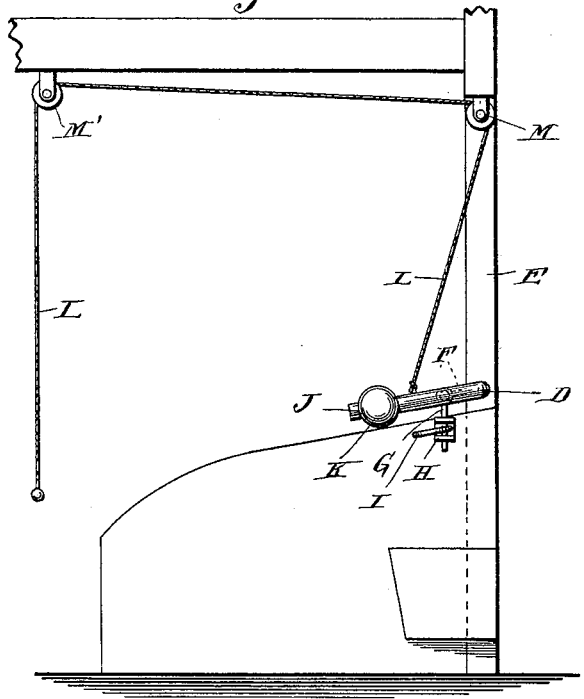
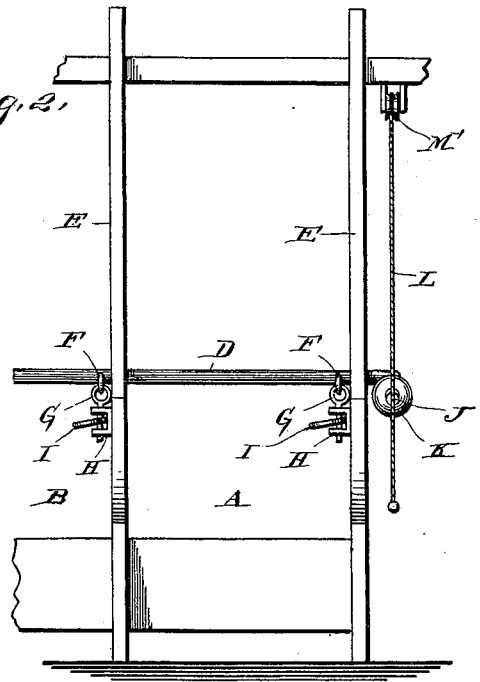
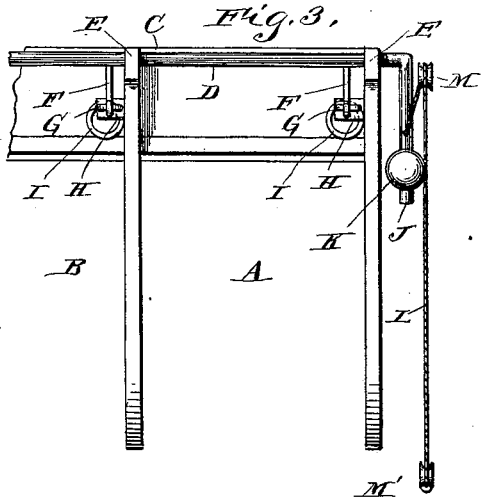
Witnesses:
Jas. C. Bernard,
Jno. Kitrell,
Inventor:
Thos. B. Laumann,
By J. P. Dederick, Atty.

UNITED STATES PATENT OFFICE.

THOMAS B. LAUMANN, OF WAPANUCKA, INDIAN TERRITORY.

ANIMAL-RELEASING DEVICE.

SPECIFICATION forming part of Letters Patent No. 631,372, dated August 22, 1899.

Application filed April 8, 1899. Serial No. 712,214. (No model.)

*To all whom it may concern:*

Be it known that I, THOMAS B. LAUMANN, a citizen of the United States, residing at Wapanucka, in the county of Atoka, Indian Territory, have invented a new and useful Animal-Releasing Device, of which the following is a specification.

My invention is in the nature of a mechanism to be erected in a stable for the purpose of releasing horses or other animals from the stalls thereof, the object of the invention being to furnish an improved apparatus for application to the stalls of a stable by means of which all horses or other animals haltered in the stalls may be released when—as, for instance, in the case of fire—there may not be sufficient time to enter each stall and release the animals singly, the apparatus being so constructed that the animals will be all simultaneously released from their stalls and free to leave the stable.

With this object in view my invention consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation, reference being had to the accompanying drawings, forming part of this specification, in which—

Figure 1 is a side elevation of the interior of a stable, illustrating the practical application of my invention. Fig. 2 is a front view, and Fig. 3 a top plan view of the same.

Like letters of reference mark the same parts wherever they occur in the various figures of the drawings.

Referring to the drawings by letters, A and B indicate the stalls of a stable, and any number may be arranged side by side, as is customary, each being provided with the usual feeding arrangements and opening into a passage leading from end to end of the stable, ingress to and egress from the stalls being provided by this passage.

Close to the wall C of building and directly above the stall-partitions extends a shaft D, preferably of pipe, which turns freely in holes through studding E, the length being governed by the number of stalls to be equipped. To said shaft D, at intervals governed by the width of the stalls, are secured levers F, the projecting ends of which terminate in an eye and engage eyepins G, that pass freely through holes in U-shaped blocks H, that are secured to side of the stalls. I are rings in which the halters attached to animals are tied. At one end of shaft D is an arm J, provided with weight K, said weight being for the purpose of holding the levers F down, thus retaining in place the pins G and rings I. To the arm J is secured a rope L, that passes upward and over pulley M, secured to the ceiling above, thence backward, overhead to, and over another pulley M', from whence it may lead to the office or other accessible point.

The construction of my invention will be readily understood from the foregoing description, and its operation may be described as follows: The stalls being occupied by the horses and fire breaking out in the stable in such a position and to such an extent as to preclude the possibility of entering each stall and releasing the animals separately, the person discovering the fire can release all the animals by pulling downward on the rope L. The effect of the pull on this rope will be to raise the pins G, thus releasing rings I in which the halters are tied, when the animals are free to leave or be driven from the stable.

While I have illustrated and described the best means now known to me for carrying out my invention, I do not wish to be understood as restricting myself to the exact details of construction shown, but hold that any slight changes or variations such as might suggest themselves to the ordinary mechanic would properly fall within the limit and scope of my invention.

Having thus fully described my invention, what I claim as new, and desire to secure by Letters Patent of the United States, is—

In an animal-releasing device, the combination of a rotatable shaft extending along the front of a series of stalls in a stable and provided with projecting levers secured thereto near the side of each stall, of a vertically-movable pin connected loosely to the projecting end of said levers, a U-shaped block secured to the side of each stall provided with holes through which the movable pin loosely passes, said pin and block securing a ring to which the haltered animals are tied substantially as shown and described.

THOMAS B. LAUMANN.

Witnesses:
WALTER L. BONER,
ALEXANDER S. HOTCHKIN.